United States Patent
Tajima (10) Patent No.: US 9,229,505 B2
(45) Date of Patent: Jan. 5, 2016

(54) POWER CONTROL APPARATUS (71) Applicant: Sony Corporation, Tokyo (JP)

(72) Inventor: Shigeru Tajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 385 days.

(21) Appl. No.: 13/715,467

(22) Filed: Dec. 14, 2012

(65) Prior Publication Data

US 2013/0179699 A1 Jul. 11, 2013

(30) Foreign Application Priority Data

Jan. 11, 2012 (JP) ................. 2012-003237

(51) Int. Cl.
G06F 1/26 (2006.01)
H04L 12/10 (2006.01)
H02J 1/08 (2006.01)

(52) U.S. Cl.
CPC .......... *G06F 1/26* (2013.01); *G06F 1/263* (2013.01); *H02J 1/08* (2013.01); *H04L 12/10* (2013.01)

(58) Field of Classification Search
CPC .............. G06F 1/26; G06F 1/263; H02J 1/08; H04L 12/10
See application file for complete search history.

(56) References Cited

U.S. PATENT DOCUMENTS

| 8,229,356 B2 * | 7/2012 | Kawamura .................. 455/41.1 |
| 2010/0081378 A1 * | 4/2010 | Kawamura .................. 455/41.1 |
| 2011/0098865 A1 * | 4/2011 | Kitano et al. ................. 700/286 |

FOREIGN PATENT DOCUMENTS

| JP | 2001-306191 | 11/2001 |
| JP | 2008-123051 | 5/2008 |

* cited by examiner

*Primary Examiner* — M Elamin

(74) *Attorney, Agent, or Firm* — Hazuki International, LLC (57) ABSTRACT There is provided a power control apparatus including a power supply control unit that executes power supply control with respect to a device connected to a power supply line, a connector that is connected to a cable to perform versatile communication between the power supply control unit and an external device, and a switch that is provided at a predetermined position of a circumferential portion of the connector and physically intercepts the versatile communication between the power supply control unit and the external device.

13 Claims, 5 Drawing Sheets

POWER CONTROL APPARATUS

CROSS REFERENCES TO RELATED APPLICATIONS

The present application claims priority to Japanese Priority Patent Application JP 2012-003237 filed in the Japan Patent Office on Jan. 11, 2012, the entire content of which is hereby incorporated by reference.

BACKGROUND

The present disclosure relates to a power control apparatus.

An alternating current is generated in a power plant to generate power and the alternating current is transmitted through a power line. The alternating current is converted into a direct current in an adapter or an electronic apparatus and is then used. However, the direct current is preferably supplied to the electronic apparatus, in terms of efficiency. Therefore, technology relating to direct-current power supply has developed.

Recently, with a surge of a power demand, power generation using natural energy such as solar power generation or wind power generation has attracted attention. However, because power generated by a solar battery is a direct current, after the direct current is converted into an alternating current, the alternating current should be converted into the direct current again, and this is inefficient. Therefore, supply of the direct-current power becomes more important in the future.

A power supply bus system in which a power supply block to supply power to an apparatus such as a battery or an AC adapter and a power consumption block receiving the power from the power supply block are connected to one common bus line for a direct current has been suggested (for example, refer to JP 2001-306191A and JP 2008-123051A). In such a power supply bus system, the direct current flows through the bus line. In the power supply bus system, the individual blocks are described as objects and the objects of the individual blocks mutually exchange information (state data) through the bus line. The object of each block generates information (state data) on the basis of a request from the object of the other block and transmits the information as reply data. The object of the block that has received the reply data can control supply or consumption of power, on the basis of the content of the received reply data.

SUMMARY

In the power supply bus system in which the power supply block and the power consumption block receiving the power from the power supply block are connected to one common bus line for a direct current, if movement of the power from the power supply block or storage of the power received from the power supply block is controlled by an internal line of the system and an information processing apparatus such as a personal computer is connected to the system to display internal information on the information processing apparatus or control the system by the information processing apparatus, it is anticipated that convenience is improved.

If the power supply bus system and the information processing apparatus are connected using a general interface such as USB, RS-232C, and WiFi, instead of a dedicated interface, a cost of the system can be suppressed from increasing. However, if the general interface is used when the power supply bus system and the information processing apparatus are connected, the power supply bus system may be captured, when the information processing apparatus is exposed to various attacks such as computer viruses due to connection with the Internet. If the power supply bus system is captured, output power may be arbitrarily changed. If the worst happens, each block forming the power supply bus system may be exploded due to a change in the voltage or current.

The information attack on the Internet becomes easy and the complete defense against the information attack is very difficult in the future. However, the information attack with respect to the power supply bus system should be defended. The reason why the information attack on the Internet is not defended is that a specification is versatile and all data is handled. Meanwhile, an attribute of information handled by the power supply bus system is limited and raw data used in a power system may not be exchanged between the system and the information processing apparatus.

It is desirable to provide a power control apparatus that can protect a device from a menace from the outside, even when a versatile information processing apparatus is connected by a versatile interface.

According to an embodiment of the present disclosure, there is provided a power control apparatus which includes a power supply control unit that executes power supply control with respect to a device connected to a power supply line, a connector that is connected to a cable to perform versatile communication between the power supply control unit and an external device, and a switch that is provided at a predetermined position of a circumferential portion of the connector and physically intercepts the versatile communication between the power supply control unit and the external device.

According to the embodiment of the present disclosure, the power supply control unit executes the power supply control with respect to the device connected to the power supply line. The connector is connected to the cable to perform versatile communication between the power supply control unit and an external device. The switch is provided in the circumferential portion of the connector and physically intercepts the versatile communication between the power supply control unit and the external device. As a result, when the external device and the power supply control unit perform the versatile communication, the communication can be arbitrarily intercepted and the device connected to the power supply line can be protected from a menace from the outside.

According to the embodiments of the present disclosure described above, a power control apparatus that can protect a device from a menace from the outside, even when a versatile information processing apparatus is connected by a versatile interface, can be provided.

Additional features and advantages are described herein, and will be apparent from the following Detailed Description and the figures.

DETAILED DESCRIPTION

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
<1. First Embodiment>
[Configuration Example of System]
[Connection Example]
<2. Second Embodiment>
<3. Third Embodiment>
<4. Fourth Embodiment>
<5. Fifth Embodiment>
<6. Sixth Embodiment>
<7. Conclusion>

<1. First Embodiment>

[Configuration Example of System]

Figure 1:
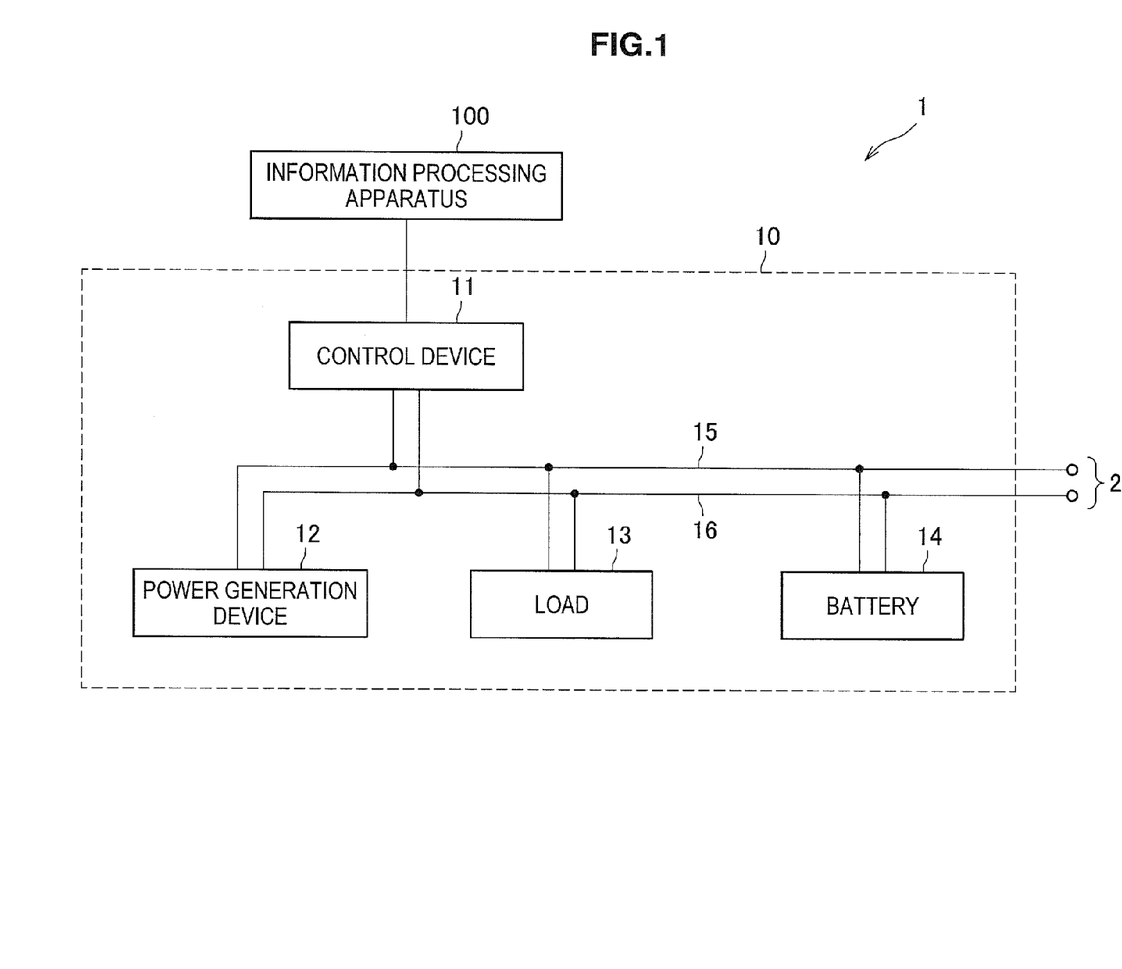
FIG. 1 is a diagram illustrating a configuration of a power supply bus system 1 according to a first embodiment of the present disclosure.

First, a configuration example of a power supply bus system according to a first embodiment of the present disclosure will be described. FIG. 1 is a diagram illustrating a configuration of a power supply bus system 1 according to the first embodiment of the present disclosure. Hereinafter, the configuration of the power supply bus system 1 according to the first embodiment of the present disclosure will be described using FIG. 1.

As illustrated in FIG. 1, the power supply bus system 1 according to the first embodiment of the present disclosure includes a cell 10 that is a minimum unit of generation and consumption of power and an information processing apparatus 100 that is connected to the cell 10. The cell 10 includes a control device 11, a power generation device 12, a load 13, a battery device 14, a power line 15, and a communication line 16. The power line 15 forms a bus line 2 with the communication line 16.

The control device 11 executes power transmission/distribution control with respect to the power generation device 12, the load 13, and the battery device 14. The power transmission/distribution control that is executed by the control device 11 is not limited to a predetermined method. For example, the control device 11 executes control to determine supply timing of the power generated by the power generation device 12 or determine the priority of the power supply. The control device 11 executes communication using the communication line 16 between the power generation device 12, the load 13, and the battery device 14 and executes the power transmission/distribution control. Each of the power generation device 12, the load 13, and the battery device 14 has unique identification information, such that the control device 11 executes the power transmission/distribution control with respect to the power generation device 12, the load 13, and the battery device 14. The identification information may be unique information like a MAC address and may be information becoming unique in a predetermined range like an IP address.

The power generation device 12 that is a device to generate power of a predetermined specification is configured using a solar battery, a wind power generator, or a manual power generator. The power that is generated by the power generation device 12 may be direct-current power or alternating-current power. However, it is preferable to generate the direct-current power, in terms of efficiency. The power that is generated by the power generation device 12 is supplied to the control device 11, the load 13, and the battery device 14 through the power line 15.

The load 13 is a device that consumes power of a predetermined specification generated by the power generation device 12. For example, the load 13 is configured using a general electric device. The load 13 receives the power generated by the power generation device 12 through the power line 15 and operates. The load 13 performs communication using the communication line 16 between the control device 11 and the load 13 and is subjected to the power transmission/distribution control by the control device 11.

The battery device 14 stores the power of the predetermined specification generated by the power generation device 12 or discharges the stored power. The battery device 14 receives the power generated by the power generation device 12 through the power line 15, under the control of the control device 11, and stores the power. The battery device 14 supplies the stored power through the power line 15, under the control of the control device 11.

A device supplied with the power generated by the power generation device 12 and a power supply time may be determined on the basis of the control of the control device 11. When the power is supplied on the basis of the control of the control device 11, a negotiation is performed by communication using the communication line 16 between the power generation device 12 and the device (for example, load 13) using the power, under the control of the control device 11. The control device 11 controls the power generation device 12 and the load 13, such that power of a specification desired by the load 13 is output from the power generation device 12 to the power line 15.

FIG. 1 shows a state in which the communication line 16 is provided separately from the power line 15. However, a function of the communication line 16 may be provided in the power line 15. The communication line 16 may be a line for wired communication. However, communication between the control device 11, the power generation device 12, the load 13, and the battery device 14 may be wireless communication.

The information processing apparatus 100 is a desktop personal computer, a laptop personal computer, a smart phone, a tablet, or other portable information terminal. The information processing apparatus 100 is connected to the control device 11 included in the cell 10 by wire or wireless. The control device 11 and the information processing apparatus 100 are connected using a general versatile interface such as USB, RS-232C, and WiFi, instead of a dedicated interface.

As illustrated in FIG. 1, if the information processing apparatus 100 is connected to the control device 11, access is performed from the information processing apparatus 100 to the control device 11 and an operation of the control device 11 can be controlled. The information processing apparatus 100 is the general versatile device and is generally configured to be connected to an external network such as the Internet.

However, as described above, when the information processing apparatus 100 is exposed to various attacks such as computer viruses due to connection with the Internet, the power supply bus system 1 illustrated in FIG. 1 may be captured. If the power supply bus system 1 is captured, that is, the control device 11 is captured, power output from the power generation device 12 may be arbitrarily changed. If the worst happens, each block (for example, the load 13 or the battery device 14) forming the power supply bus system 1 may be failed due to a change in the voltage or current. As a result, each block may be exploded.

Therefore, in the power supply bus system 1, it is preferable to limit a remote operation from the information processing apparatus 100 to the control device 11, even when the information processing apparatus 100 is connected to the control device 11. In this embodiment, a switch to permit communication from the information processing apparatus 100 to the control device 11 is provided in the control device 11.

[Connection Example]

Figure 2:
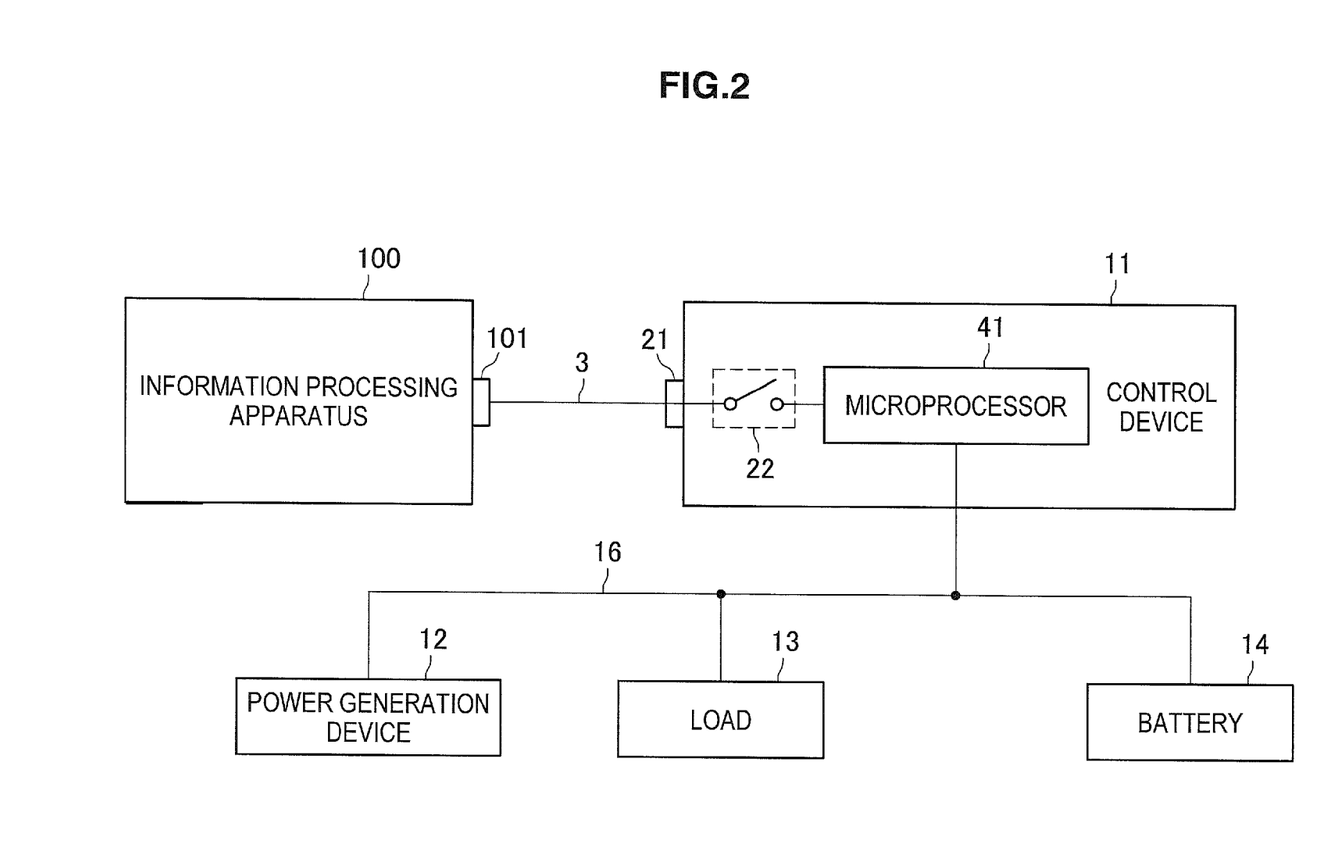
FIG. 2 is a diagram illustrating a connection example of a control device 11 and an information processing apparatus 100 in the power supply bus system 1 according to the first embodiment of the present disclosure.

FIG. 2 is a diagram illustrating a connection example of the control device 11 and the information processing apparatus 100 in the power supply bus system 1 according to the first embodiment of the present disclosure. As illustrated in FIG. 2, versatile connectors 21 and 101 are provided in the control device 11 and the information processing apparatus 100, respectively, the versatile connectors 21 and 101 are connected by a connection cable 3, and the control device 11 and the information processing apparatus 100 are connected to each other. As illustrated in FIG. 2, the control device 11 is provided with a microprocessor 41 to control power supply with respect to the power generation device 12, the load 13, and the battery device 14.

As illustrated in FIG. 2, in the control device 11, a switch 22 is provided in the vicinity of the versatile connector 21. The switch 22 is normally intercepted and communication is limited such that communication between the control device 11 and the information processing apparatus 100 is disabled, only when the connection cable 3 is connected to the versatile connector 21. The switch 22 may be a mechanical switch, a relay switch, or a switch to physically switch a connection state and an interception state.

That is, if the connection cable 3 is connected to the versatile connector 21 and a user changes a state of the switch 22 from the interception state to the connection state, communication between the control device 11 and the information processing apparatus 100 is enabled. Thereby, because the control device 11 and the information processing apparatus 100 can be prevented from being connected without the explicit connection intention by the user, the microprocessor 41 can be prevented from being externally captured. As a result, an effect of protecting the control device 11 from a menace from the outside can be anticipated.

<2. Second Embodiment>

[Connection Example]

In the first embodiment, the configuration in which the switch to physically switch the connection state and the interception state is provided in the control device and connection or disconnection of the control device 11 and the information processing apparatus 100 is switched has been described. In this configuration, the control device 11 and the information processing apparatus 100 are connected by Ethernet (registered trademark) and the information processing apparatus 100 is disposed permanently in the vicinity of the control unit device 11.

However, in the power supply bus system, it is preferable that the control device 11 and the information processing apparatus 100 be not connected at all times, to improve safety of the power supply bus system. Therefore, the switch provided in the control device 11 is configured as a momentary switch such as a push-button switch and connection between the control device 11 and the information processing apparatus 100 is permitted for only a predetermined time.

Figure 3:
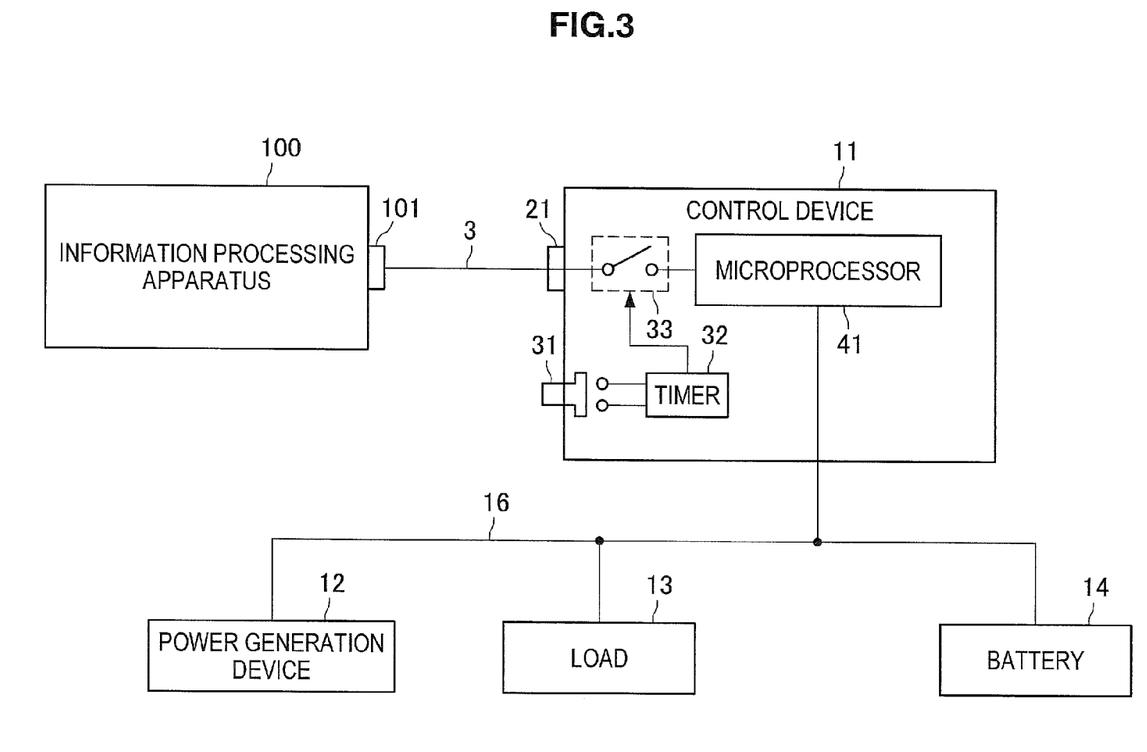
FIG. 3 is a diagram illustrating a connection example of a control device 11 and an information processing apparatus 100 in a power supply bus system 1 according to a second embodiment of the present disclosure.

FIG. 3 is a diagram illustrating a connection example of the control device 11 and the information processing apparatus 100 in the power supply bus system 1 according to the second embodiment of the present disclosure. As illustrated in FIG. 3, the versatile connectors 21 and 101 are provided in the control device 11 and the information processing apparatus 100, respectively, the versatile connectors 21 and 101 are connected by the connection cable 3, and the control device 11 and the information processing apparatus 100 are connected. As illustrated in FIG. 3, the control device 11 is provided with a microprocessor 41 to control power supply with respect to the power generation device 12, the load 13, and the battery 14.

In the control device 11, a push-button switch 31, a timer 32, and an electronic switch 33 are provided. In order to enable communication between the control device 11 and the information processing apparatus 100, the user connects the versatile connectors 21 and 101 by the connection cable 3 and pushes the push-button switch 31 provided in the control device 11. The timer 32 starts according to pushing of the push-button switch 31 and the electronic switch 33 is turned on. As the electronic switch 33, a switch such as a transistor in which a connection state and an interception state are electrically switched is used. If a predetermined time passes, the timer 32 is stopped and the electronic switch 33 is turned off according to the stop of the timer 32.

As such, if a configuration where connection is intercepted when the predetermined time passes is provided in the control device 11, the user can be prevented from forgetting to perform switching and an effect of protecting the control device 11 from a menace from the outside can be anticipated more as compared with the first embodiment.

The push-button switch 31 may be connected to a port of a microprocessor (not illustrated in the drawings) to be provided in the control device 11 and control communication and permission and non-permission of communication may be switched in a software manner. However, if the possibility of the microprocessor of the control device 11 being captured by a malicious third party and the malicious third party controlling the microprocessor is considered, the push-button switch 31, the timer 32, and the electronic switch 33 preferably turn on/off the communication line directly without control from the microprocessor, in order to exclude the possibility of a remote operation.

In this embodiment, the mechanical switch that is provided in the control device 11 is configured as the momentary switch. However, the mechanical switch that is provided in the control device 11 may be configured as a switch having three positions of momentary ON, ON, and OFF. That is, connection between the control device 11 and the information processing apparatus 100 may be permitted only when the mechanical switch provided in the control device 11 is at the position of the momentary ON. The mechanical switch that is provided in the control device 11 is not limited to the configuration described above and all switches that automatically intercept the communication line when a predetermined time passes may be used.

<3. Third Embodiment>

In the first and second embodiments of the present disclosure described above, communication between the control device 11 and the information processing apparatus 100 is not permitted as long as the communication line of the control device 11 is not in a connection state, when the control device 11 and the information processing apparatus 100 are connected by the connection cable 3.

The configuration of each embodiment improves the safety of the power supply buy system 1 by that the configuration may not be embodied when the operation of setting the communication line of the control device 11 to the connection state is not performed in the vicinity of the power supply bus system 1. However, because it is requested to monitor or control the power supply bus system from a remote place, to completely exclude the request deteriorates convenience of the system.

Therefore, in the third embodiment of the present disclosure, a configuration in which the control device 11 can be protected from a menace from the outside even when communication between the control device 11 and the information processing apparatus 100 is performed temporarily or permanently will be described.

When the communication between the control device 11 and the information processing apparatus 100 is performed temporarily or permanently, if the information processing apparatus 100 is connected to the Internet or other networks, the information processing apparatus 100 may be exposed to attacks from malicious software such as computer viruses or cyber attacks using other information processing apparatuses, as described above.

Under this situation, in a structure in which the information processing apparatus 100 is connected to the control device 11 through the connection cable 3 and has access to internal information of the control device 11 or the internal information of the control device 11 is transmitted as raw information to the information processing apparatus 100 through the connection cable 3 or a structure in which an internal control command is received as it is with respect to the control device 11, the control device 11 may not be protected from a menace from the outside.

The power supply bus system 1 may exchange the following information with the information processing apparatus 100 to be an external apparatus.

(1) Information showing whether the power supply bus system 1 has sufficient power (2) Information showing whether the power supply bus system 1 supplies power to the outside (3) Information showing whether the power supply bus system 1 can receive power from the outside (4) Information showing whether the power supply bus system 1 can negotiate with the outside (for example, with respect to power charges)

The information that is described in this embodiment is exemplary and the information that is preferably exchanged between the power supply bus system 1 and the information processing apparatus 100 is not limited to the examples described above. However, it is important to use information obtained by concealing and abstracting raw information used in the power supply bus system 1, not the raw information. That is, an important point in the information that is exchanged between the power supply bus system 1 and the information processing apparatus 100 is that the information is abstracted and direct access to an internal structure of the power supply bus system 1 is disabled under all situations.

In other words, when the power supply bus system 1 performs communication with the information processing apparatus 100 using a versatile communication protocol, a command corresponding to the abstracted information is defined. Thereby, specific control information in the power supply bus system 1 can be prevented from leaking to the outside.

This embodiment relates to a software measure in principle. However, when the microprocessor provided in the control device 11 operates on the basis of a ROM, the internal information of the power supply bus system 1 may not be controlled as long as software written in the ROM is not rewritten from the outside. For this reason, safety against an external attack is high.

Examples of the commands that correspond to the abstracted information are described below. In the present disclosure, the commands corresponding to the abstracted information are not limited to the following examples.

GetPowerStatus (int sys_address);

A system address is used as a parameter and a power status is inquired.

RepPowerStatus (int sys_address, unsigned char power_staus);

A system address is designated and a reply for the power status is received. Reply contents are sufficient supply power, insufficient supply power, shortage of power, and reply rejection.

ReadyPowerSupply (int sys_address, int wattage, int time_st, int time_sp);

A system address is designated, supply power and a supply time are used as parameters, and it is inquired whether power can be supplied.

RepReadyPowerSupply (int sys_address, int wattage, int time_st, int_time_sp);

A system address is designated, a supply enabled power amount and a supply time are used as parameters, and a reply is made.

StartPowerSupply (int sys_address, int wattage, int time_st, int time_sp);

A system address is designated, supply power and a supply time are used as parameters, and power supply is requested.

RepPowerSipply (int sys_address, int wattage, int time_st, int time_sp);

A system address is designated, supply power and a supply time are used as parameters, and power supply start is replied.

GetNegoProtocol (int sys_address);

When a detailed negotiation is necessary with respect to power supply, a protocol number is inquired.

RepNegoProtocol (int sys_address, unsigned char protocol);

When a detailed negotiation is necessary with respect to power supply, a protocol number is replied.

In addition, a necessary command set such as a voltage or a current may be prepared. However, instead of the raw information of the system, the control device 11 preferably transmits processed information as a reply to the information processing apparatus 100. For example, in the case of the voltage, the control device 11 transmits a voltage supply range or a nominal voltage as a reply.

Reply rejection with respect to a command transmitted from the information processing apparatus 100 to the control device 11 may be considered. This means that a function to exclude interference is provided, because each system is basically a completed autonomous system. By moderately coupling these systems, a stubborn nature, extensibility, reliability, and scalability of the system can be raised.

<4. Fourth Embodiment>

In the third embodiment of the present disclosure described above, when the control device 11 exchanges information with the information processing apparatus 100 using the versatile communication protocol, the information used by the power supply bus system 1 is maximally shielded and only the abstract information is exchanged between the control device 11 and the information processing apparatus 100. In the fourth embodiment of the present disclosure, an example of the case in which the embodiments described above are combined and safety against external attacks is raised will be described.

Figure 4:
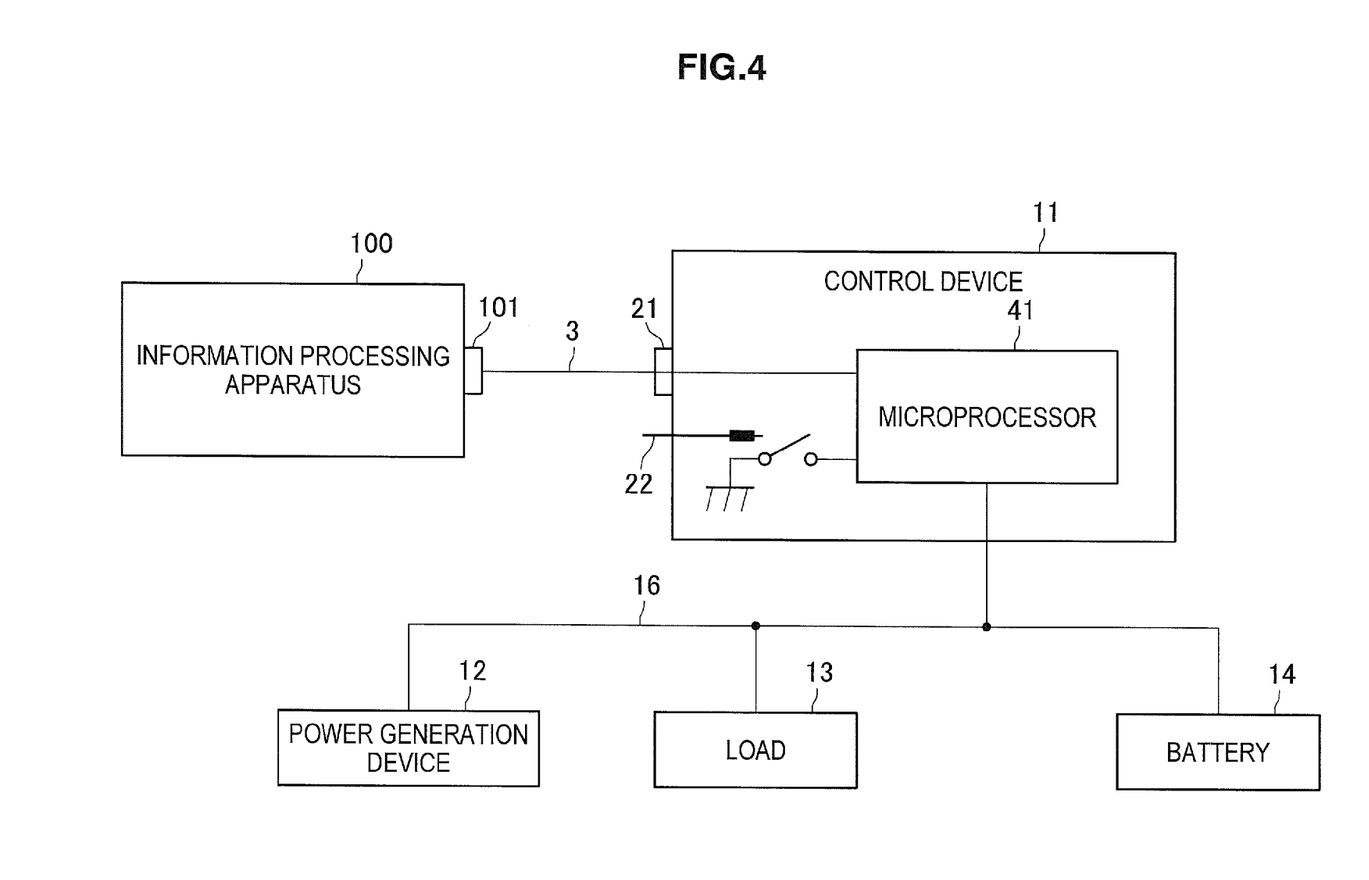
FIG. 4 is a diagram illustrating a connection example of a control device 11 and an information processing apparatus 100 in a power supply bus system 1 according to a fourth embodiment of the present disclosure.

FIG. 4 is a diagram illustrating a connection example of the control device 11 and the information processing apparatus 100 in the power supply bus system 1 according to the fourth embodiment of the present disclosure. As illustrated in FIG. 4, the versatile connectors 21 and 101 are provided in the control device 11 and the information processing apparatus 100, respectively, the versatile connectors 21 and 101 are connected by a connection cable 3, and the control device 11 is connected to the information processing apparatus 100.

As illustrated in FIG. 4, in the control device 11, a switch 22 is provided in the vicinity of the versatile connector 21. The switch 22 is normally turned off and communication between the control device 11 and the information processing apparatus 100 is limited to communication based on the abstracted command, in a state in which the connection cable 3 is connected to the versatile connector 21. The switch 22 may be a mechanical switch, a release switch, or a switch to physically switch a connection state and an interception state.

A state of the switch 22 is detected by the microprocessor 41. As described above, if the switch 22 is turned off, the microprocessor 41 limits the communication between the control device 11 and the information processing apparatus 100 to the communication based on the abstracted command. Meanwhile, if the user turns on the switch 22, the microprocessor 41 does not limit the communication between the control device 11 and the information processing apparatus 100 to the communication based on the abstracted command and enables specific control and information read with respect to the control device 11.

The switch 22 that is provided in the control device 11 may be configured as a momentary switch such as a push-button switch and specific control and information read with respect to the control device 11 may be enabled in the communication between the control device 11 and the information processing apparatus 100, for only a predetermined time. When the switch 22 is turned off, the communication between the control device 11 and the information processing apparatus 100 may be limited to be disabled. When the switch 22 is turned on, the microprocessor 41 may limit the communication between the control device 11 and the information processing apparatus 100 to the communication based on the abstracted command and execute the communication. Even in this case, the switch 22 that is provided in the control device 11 may be configured as the momentary switch such as the push-button switch and the communication between the control device 11 and the information processing apparatus 100 may be limited to the communication based on the abstracted command, for only the predetermined time.

When the microprocessor 4 operates on the basis of a ROM and a program may not be easily rewritten from the outside, if the control device 11 has a structure illustrated in FIG. 4, safety against an external attack can be raised.

<5. Fifth Embodiment>

In the fourth embodiment of the present disclosure described above, it is determined whether the communication between the control device 11 and the information processing apparatus 100 is limited to the communication based on the abstracted command, by the switch 22 provided in the control device 11. However, as described above, when the microprocessor 41 operates on the basis of a ROM and a program may be easily rewritten from the outside, a measure with respect to rewriting from the outside is insufficient. Therefore, in the fifth embodiment of the present disclosure described below, an example of the case in which a communication processor is provided separately from a processor for control and a measure with respect to rewriting from the outside is taken will be described.

Figure 5:
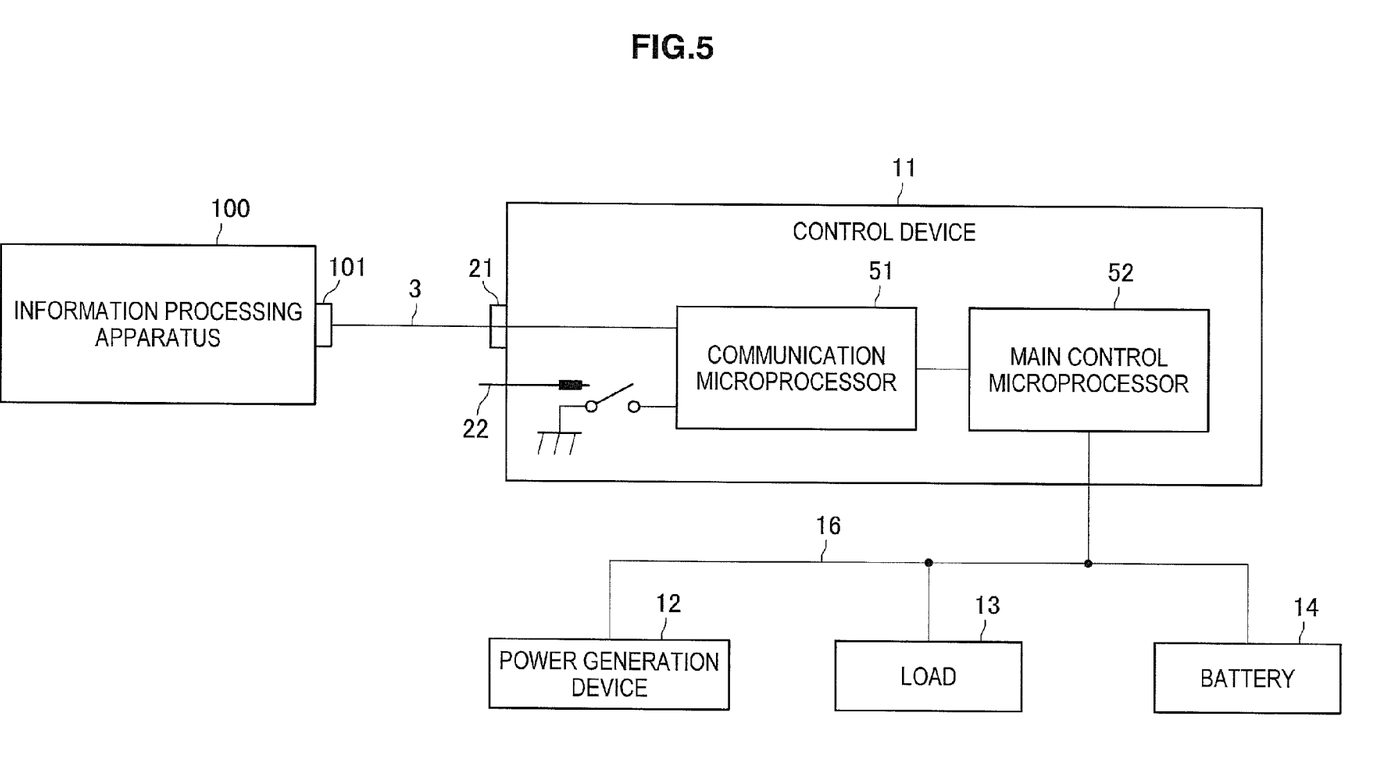
FIG. 5 is a diagram illustrating a connection example of a control device 11 and an information processing apparatus 100 in a power supply bus system 1 according to a fifth embodiment of the present disclosure.

FIG. 5 is a diagram illustrating a connection example of the control device 11 and the information processing apparatus 100 in the power supply bus system 1 according to the fifth embodiment of the present disclosure. As illustrated in FIG. 5, the versatile connectors 21 and 101 are provided in the control device 11 and the information processing apparatus 100, respectively, the versatile connectors 21 and 101 are connected by a connection cable 3, and the control device 11 is connected to the information processing apparatus 100.

As illustrated in FIG. 5, in the control device 11, a switch 22 is provided in the vicinity of the versatile connector 21. The switch 22 is normally turned off and communication between the control device 11 and the information processing apparatus 100 is limited to communication based on the abstracted command, in a state in which the connection cable 3 is connected to the versatile connector 21. The switch 22 may be a mechanical switch, a relay switch, or a switch to physically switch a connection state and an interception state.

A state of the switch 22 is detected by the communication microprocessor 51. As described above, if the switch 22 is turned off, the communication microprocessor 51 limits the communication between the control device 11 and the information processing apparatus 100 to the communication based on the abstracted command. Meanwhile, if the user turns on the switch 22, the communication microprocessor 51 does not limit the communication between the control device 11 and the information processing apparatus 100 to the communication based on the abstracted command and enables specific control and information read with respect to the control device 11.

The switch 22 that is provided in the control device 11 may be configured as a momentary switch such as a push-button switch and the communication between the control device 11 and the information processing apparatus 100 may be limited to the communication based on the abstracted command, for only a predetermined time.

The control device 11 includes a main control microprocessor 52 in addition to the communication microprocessor 51. The main control microprocessor 52 executes power supply control of the power supply bus system 1. In order to make the communication microprocessor 51 operate on the basis of the ROM and rewrite a program, a measure in which a case of the control device 11 should be opened and a password is requested with respect to rewriting of the program is taken.

As such, by taking the measure with respect to the rewriting of the program with respect to the communication microprocessor 51, safety against external attacks with respect to the main control microprocessor 52 can be raised.

<6. Sixth Embodiment>

As described above, when communication is performed between the control device 11 and the information processing apparatus 100 using the versatile protocol, the information used by the power supply bus system 1 is concealed and transmission and reception of only the abstract information is permitted. As a result, even if the information processing apparatus 100 is attacked, the control device 11 can be protected from external attacks.

If the detailed internal information used by the power supply bus system 1 is limited to be read only from the information processing apparatus 100, the power supply bus system 1 is rarely attacked from the information processing apparatus 100, even when the communication is performed between the control device 11 and the information processing apparatus 100 using the versatile protocol.

Therefore, in this embodiment, similar to the other embodiments described above, a read dedicated position is prepared in the control device 11 by a hardware-like switch. When this switch is prepared in the control device 11, internal data (a voltage, the number of batteries, and a remaining battery amount) is set such that all information prepared by the control device 11 of the power supply bus system 1 can be read.

As such, if all information prepared by the control device 11 are set to be readable, rich external display is performed on the information processing apparatus 100 using the information and convenience is improved in an actual operation to confirm a state of the power supply bus system 1. In the case of only information read, a switch operation is not necessary. However, because a remote operation is prohibited in principle in the power supply bus system 1 according to this embodiment, the switch is prepared.

Meanwhile, because control is disabled from the information processing apparatus 100 to the control device 11, the abstract command described in the embodiments can be used with regard to the control. That is, in this embodiment, a read command to read information of the control device 11 and a control command to control the control device 11 are set as different portions of software layers, so that the control device 11 is protected from the external attacks.

Read command: hardware control layer of software
Control command: application layer The switch 22 that is provided in the control device 11 may be configured as the momentary switch such as the push-button switch and the communication between the control device 11 and the information processing apparatus 100 may be limited to the communication based on the abstracted command, for only the predetermined time.

As such, even when a read dedicated position is prepared in the control device 11 by the hardware-like switch and communication is performed between the control device 11 and the information processing apparatus 100 using the versatile protocol, the control device 11 can be protected from an attack to alter internal information of the control device 11. When a command is sent from the information processing apparatus 100 to the control device 11, the communication between the control device 11 and the information processing apparatus 100 is performed on the basis of the abstracted command, by operating the switch prepared in the control device 11. Even when the control device 11 has the configuration described above and the communication using the versatile protocol is performed between the control device 11 and the information processing apparatus 100, the power supply bus system 1 can be protected from the information processing apparatus 100.

<7. Conclusion>

As described above, according to each embodiment of the present disclosure, when the control device 11 to control the power supply from the power generation device 12 to the load 13 or the battery device 14 and the information processing apparatus 100 to be the desktop personal computer, the laptop personal computer, the smart phone, the tablet, and other portable information terminal perform communication using the versatile protocol, even if the information processing apparatus 100 may be attacked from malicious software, the control device 11 can protect each device forming the power supply bus system 1 from the external attacks.

For example, the communication is limited such that the communication between the control device 11 and the information processing apparatus 100 is disabled, when the switch is provided in the control device 11 and the switch is not turned on, or the communication is limited such that the communication is enabled, only when the switch is turned on and a predetermined time passes. The command that is exchanged between the control device 11 and the information processing apparatus 100 is limited to a command abstracted with regard to the power supply bus system 1. The physical measure and the software-like measure are combined. By the configuration described above, the control device 11 can protect each device forming the power supply bus system 1 from the external attack.

In addition, the microprocessors provided in the control device 11 are divided for the communication and the control, so that each device forming the power supply bus system 1 can be protected from the external attack.

In the embodiments described above, the control device 11 and the power generation device 12 or the battery device 14 are the separate devices. However, the present disclosure is not limited to the examples described above. That is, the control device 11 may internally have a power generation function and a storage function.

It should be understood by those skilled in the art that various modifications, combinations, sub-combinations and alterations may occur depending on design requirements and other factors insofar as they are within the scope of the appended claims or the equivalents thereof Additionally, the present application may also be configured as below.

(1) A power control apparatus including:

a power supply control unit that executes power supply control with respect to a device connected to a power supply line;

a connector that is connected to a cable to perform versatile communication between the power supply control unit and an external device; and a switch that is provided at a predetermined position of a circumferential portion of the connector and physically intercepts the versatile communication between the power supply control unit and the external device.

(2) The power control apparatus according to (1), wherein the power supply control unit executes communication based on an abstracted command of the power supply control between the external device and the power supply control unit.

(3) The power control apparatus according to (2), wherein, when the switch is turned on, the power supply control unit executes communication based on the abstracted command of the power supply control between the external device and the power supply control unit.

(4) The power control apparatus according to (3), wherein, when the switch is turned on, the power supply control unit receives only the abstracted command of the power supply control between the external device and the power supply control unit.

(5) The power control apparatus according to any one of (2) to (4), wherein, when the switch is turned on, the power supply control unit executes communication based on the abstracted command of the power supply control between the external device and the power supply control unit, for only a predetermined time from turning-on of the switch.

(6) The power control apparatus according to any one of (1) to (5), wherein the switch permits the versatile communication between the power supply control unit and the external device, for only a predetermined time from turning-on of the switch.

(7) The power control apparatus according to any one of (1) to (6),
wherein the power supply control unit sets a limit to information regarding the power supply control so as to be read only from the external device.

(8) The power control apparatus according to (7),
wherein, when the switch is turned on, the power supply control unit removes the limit on the information regarding the power supply control.

(9) The power control apparatus according to (7) or (8),
wherein, when the switch is turned on, the power supply control unit removes the limit on the information regarding the power supply control, for only a predetermined time from turning-on of the switch.

(10) The power control apparatus according to any one of (1) to (9), further including:
a power generation unit that generates power and supplies the generated power to the power supply line.

(11) The power control apparatus according to any one of (1) to (10), further including:
a storage unit that receives the generated power from the power supply line and stores the power.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A power control apparatus comprising:
a power supply control unit that executes power supply control with respect to a device connected to a power supply line;
a connector that is connected to a cable to perform versatile communication between the power supply control unit and an external device; and
a switch that is provided at a predetermined position of a circumferential portion of the connector and physically intercepts the versatile communication between the power supply control unit and the external device, wherein internal information of the power supply control unit is concealed and abstracted in the versatile communication between the power supply control unit and the external device.

2. The power control apparatus according to claim 1, wherein the power supply control unit executes communication based on an abstracted command of the power supply control between the external device and the power supply control unit.

3. The power control apparatus according to claim 2, wherein, when the switch is turned on, the power supply control unit executes communication based on the abstracted command of the power supply control between the external device and the power supply control unit.

4. The power control apparatus according to claim 3, wherein, when the switch is turned on, the power supply control unit receives only the abstracted command of the power supply control between the external device and the power supply control unit.

5. The power control apparatus according to claim 2, wherein, when the switch is turned on, the power supply control unit executes communication based on the abstracted command of the power supply control between the external device and the power supply control unit, for only a predetermined time from turning-on of the switch.

6. The power control apparatus according to claim 1, wherein the switch permits the versatile communication between the power supply control unit and the external device, for only a predetermined time from turning-on of the switch.

7. The power control apparatus according to claim 1, wherein the power supply control unit sets a limit to information regarding the power supply control so that the information is read only from the external device.

8. The power control apparatus according to claim 7, wherein, when the switch is turned on, the power supply control unit removes the limit on the information regarding the power supply control.

9. The power control apparatus according to claim 7, wherein, when the switch is turned on, the power supply control unit removes the limit on the information regarding the power supply control, for only a predetermined time from turning-on of the switch.

10. The power control apparatus according to claim 1, further comprising:
a power generation unit that generates power and supplies the generated power to the power supply line.

11. The power control apparatus according to claim 1, further comprising:
a storage unit that receives the generated power from the power supply line and stores the power.

12. The power control apparatus according to claim 1, wherein a direct access by the external device to an internal structure of a power supply bus system is disabled, and wherein the internal information corresponds to raw information of the power supply bus system.

13. The power control apparatus according to claim 1, wherein a read command to read the internal information of the power supply control unit and a control command to control the power supply control unit are set as different portions in separate layers.

* * * * *